US012657915B2

(12) United States Patent
Kim et al.

(10) Patent No.: US 12,657,915 B2
(45) Date of Patent: Jun. 16, 2026

(54) GENERATION OF PANORAMIC SURVEILLANCE IMAGE

(71) Applicant: HANWHA VISION CO., LTD., Seongnam-si (KR)

(72) Inventors: Gwantae Kim, Seongnam-si (KR); Youngchan Lee, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/825,393

(22) Filed: Sep. 5, 2024

(65) Prior Publication Data

US 2024/0428589 A1      Dec. 26, 2024

Related U.S. Application Data

(63) Continuation of application No. PCT/KR2023/003110, filed on Mar. 7, 2023.

(30) Foreign Application Priority Data

Mar. 7, 2022      (KR) ........................ 10-2022-0028676

(51) Int. Cl.
*G06V 20/40*          (2022.01)
*G06T 3/4038*        (2024.01)
*G06V 10/764*        (2022.01)

(52) U.S. Cl.
CPC ............ *G06V 20/44* (2022.01); *G06T 3/4038* (2013.01); *G06V 10/764* (2022.01)

(58) Field of Classification Search
CPC ...... G06V 20/44; G06V 10/764; G06V 20/52; G06T 3/4038; G06T 7/20; H04N 7/18;
(Continued)

(56) References Cited

U.S. PATENT DOCUMENTS 7,738,008 B1 *    6/2010   Ball ..................... G06V 20/653
                                                      348/169
2013/0094703 A1 *  4/2013   Gottschlag ............. G06V 20/52
                                                      382/103
(Continued)

FOREIGN PATENT DOCUMENTS

JP            2018113628 A  *  7/2018
KR     10-2016-0048178 A       5/2016
(Continued)

OTHER PUBLICATIONS

International Search Report (PCT/ISA/210) issued on Jun. 13, 2023 by the International Searching Authority in International Application No. PCT/KR2023/003110.
(Continued)

*Primary Examiner* — Thai Q Tran
*Assistant Examiner* — Stephen R Smith
(74) *Attorney, Agent, or Firm* — Sughrue Mion, PLLC

(57)          ABSTRACT

A panoramic surveillance video generating apparatus includes: a plurality of image sensors configured to acquire a plurality of surveillance videos; and at least one processor configured to: generate a panoramic video by combining the plurality of surveillance videos, detect an event occurring in the panoramic video, set a partial region of the panoramic video as a surveillance region, output a video of the surveillance region to a virtual channel, and adjust at least one of a quantity of the surveillance region, a size of the surveillance region, and a position of the surveillance region based on an event detection result.

17 Claims, 7 Drawing Sheets

10

(58) Field of Classification Search
CPC ...... H04N 23/60; H04N 23/69; H04N 23/695;
H04N 23/698
USPC ................................. 348/143, 159; 382/103
See application file for complete search history.

(56) References Cited

U.S. PATENT DOCUMENTS

| | | | |
|---|---|---|---|
| 2016/0042622 A1* | 2/2016 | Takiguchi ........ | G08B 13/19608 |
| | | | 348/143 |
| 2016/0212337 A1* | 7/2016 | Sagas ..................... | H04N 5/262 |
| 2023/0129908 A1* | 4/2023 | Yuan .................. | H04N 21/2365 |
| | | | 348/159 |
| 2024/0015398 A1* | 1/2024 | Sugimoto .............. | H04N 7/183 |

FOREIGN PATENT DOCUMENTS

| | | | | | |
|---|---|---|---|---|---|
| KR | 10-2016-0094655 A | | 8/2016 | | |
| KR | 20160094655 A | * | 8/2016 | ......... | H04N 5/23225 |
| KR | 10-2022-0003779 A | | 1/2022 | | |
| KR | 20220003779 A | * | 1/2022 | ........... | G06F 16/738 |
| WO | 2021/247006 A1 | | 12/2021 | | |

OTHER PUBLICATIONS

Written Opinion (PCT/ISA/237) issued on Jun. 13, 2023 by the International Searching Authority in International Application No. PCT/KR2023/003110.
International Preliminary Report on Patentability (PCT/IB/373) issued Sep. 10, 2024 in International Application No. PCT/KR2023/003110.

* cited by examiner

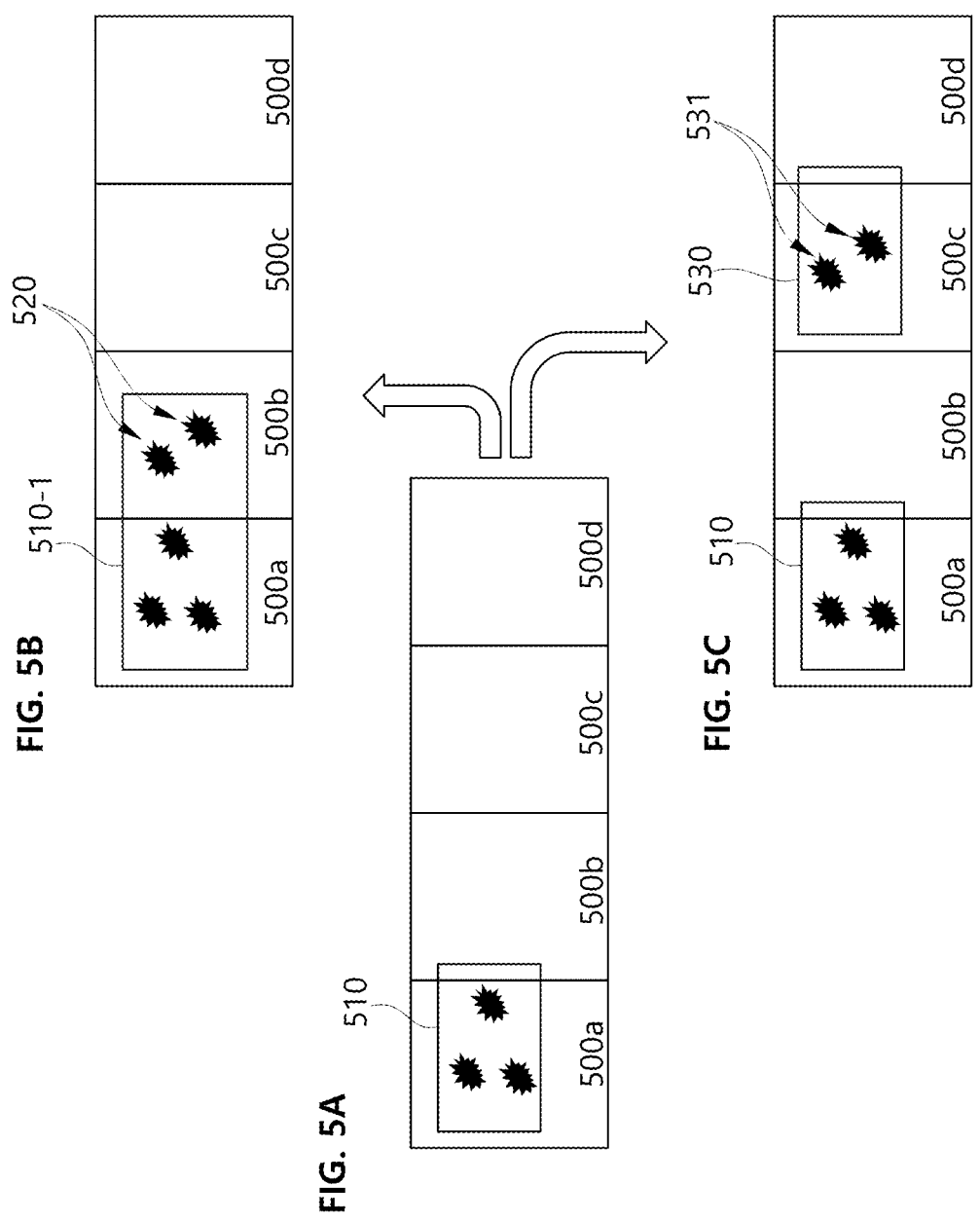

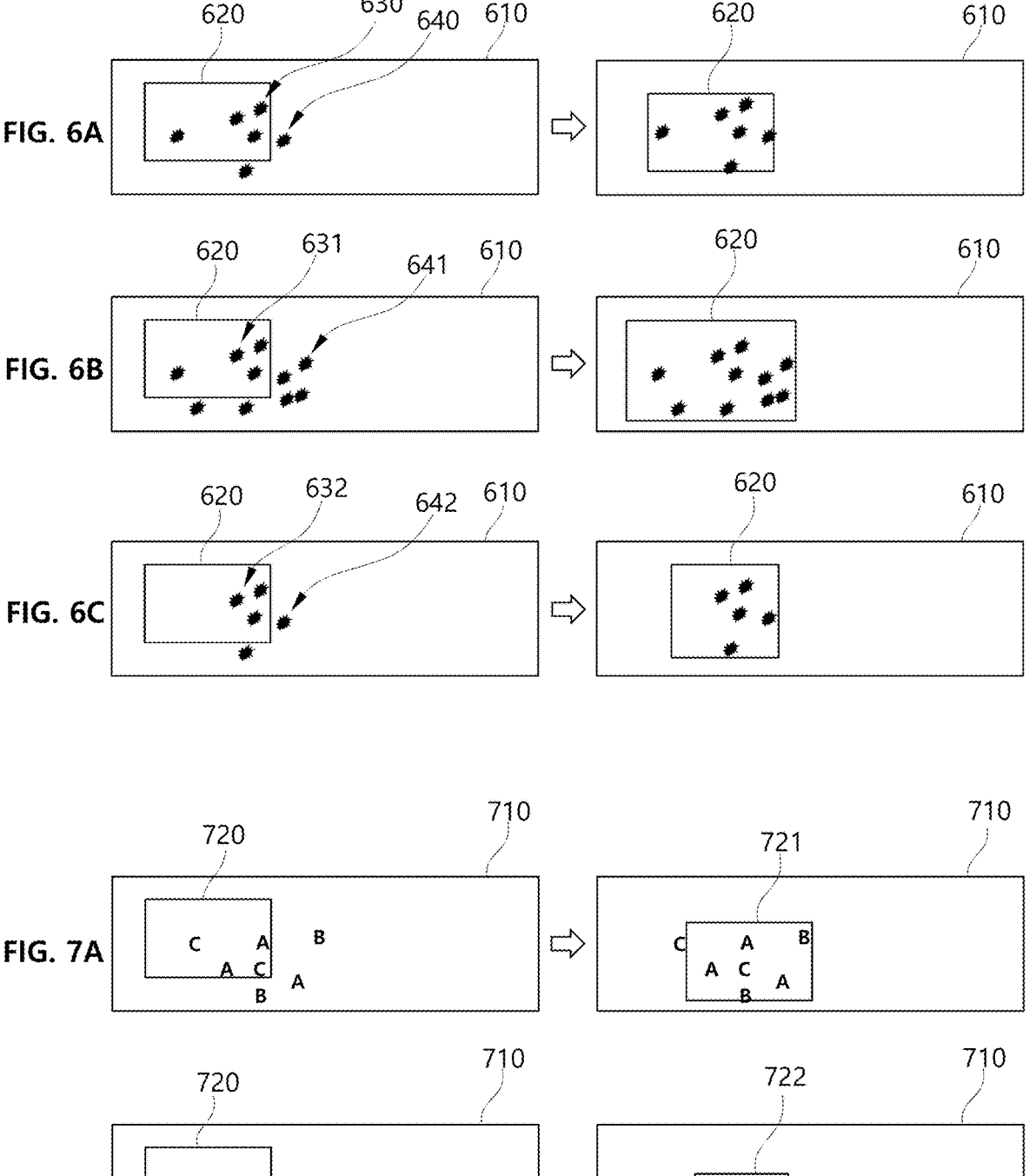

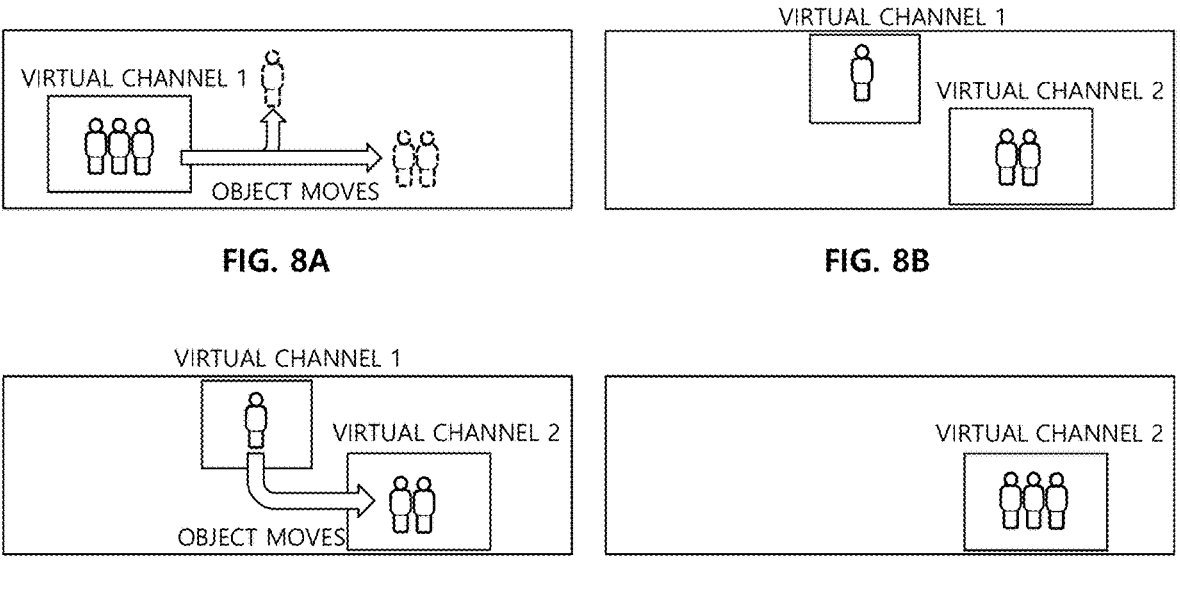
FIG. 8A
FIG. 8B
FIG. 8C
FIG. 8D
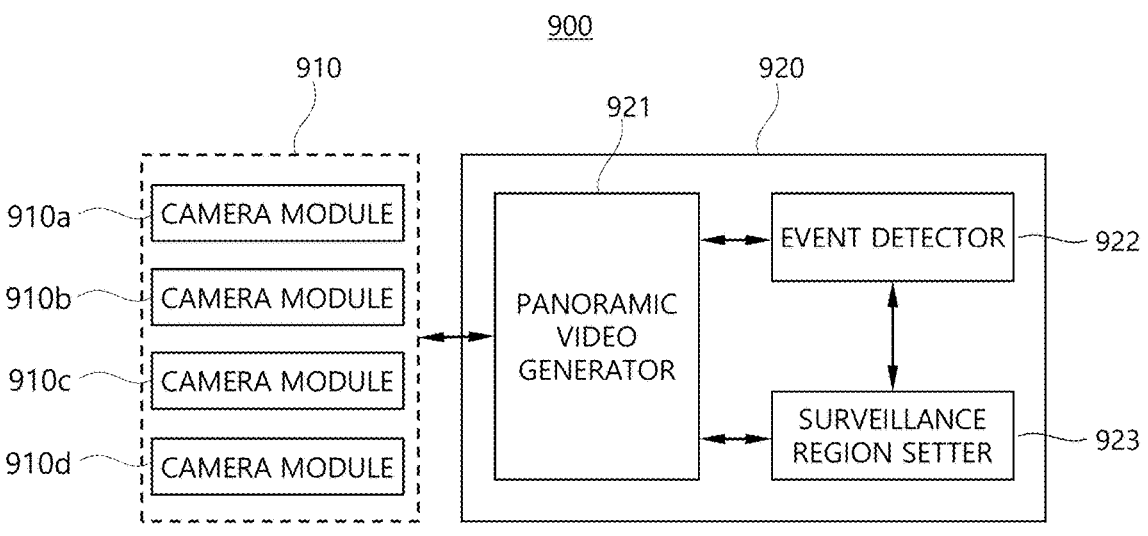
FIG. 9

GENERATION OF PANORAMIC SURVEILLANCE IMAGE

CROSS-REFERENCE TO RELATED APPLICATION(S)

This application is a continuation of International Application No. PCT/KR2023/003110, filed on Mar. 7, 2023, in the Korean Intellectual Property Receiving Office, which is based on and claims priority to Korean Patent Application No. 10-2022-0028676, filed on Mar. 7, 2022, in the Korean Intellectual Property Office, the disclosures of which are incorporated by reference herein in their entireties.

BACKGROUND

1. Field

The present disclosure relates to the generation of panoramic surveillance video.

2. Description of Related Art

Panoramic technology has been widely used in the surveillance system field for wide-area surveillance. Existing CCTV cameras cannot observe regions other than a designated viewing angle, and even if a surveillance region is adjusted using a PTZ camera, it is impossible to observe a large region simultaneously. To solve this problem, panoramic technology has been used in a variety of ways, both indoors and outdoors.

Meanwhile, virtual channel technology is a technology that outputs only a specific portion of the entire output video to a separate virtual channel and is used to increase surveillance efficiency by outputting video for a specific region from a wide range of video, such as a panoramic video, to a separate channel.

Related art panoramic surveillance video generation technology generates a panoramic video by combining video data received from a plurality of image sensors or a plurality of camera modules and fixedly outputs a specific region thereof to a virtual channel, causing a problem of deteriorating surveillance efficiency as the region to be monitored is fixed. Thus, there may be a need for technology to effectively use virtual channels.

The problems to be solved by the present disclosure are not limited to the problems mentioned above, and other problems not mentioned may be clearly understood by those skilled in the art from the description below.

SUMMARY

Aspects will be set forth in part in the description which follows and, in part, will be apparent from the description, or may be learned by practice of the presented embodiments.

According to an aspect of the disclosure, a panoramic surveillance video generating apparatus may include: a plurality of image sensors configured to acquire a plurality of surveillance videos; and at least one processor configured to: generate a panoramic video by combining the plurality of surveillance videos, detect an event occurring in the panoramic video, set a partial region of the panoramic video as a surveillance region, output a video of the surveillance region to a virtual channel, and adjust at least one of a quantity of the surveillance region, a size of the surveillance region, and a position of the surveillance region based on an event detection result.

The at least one processor may be further configured to: determine an occurrence position at which the detected event occurs, and adjust at least one of the quantity of surveillance region, the size of the surveillance region, and the position of the surveillance region based on the occurrence position of the detected event.

The detected event occurring in the panoramic video may include a first event within the partial region, and a second event outside the partial region, where the at least one processor is further configured to: based on a separation degree between a first occurrence position at which the first event occurs within the partial region and a second occurrence position at which the second event occurs outside the partial region being within a predetermined separation criterion, perform at least one operation among moving the surveillance region, enlarging the surveillance region, and reducing the surveillance region to include the second occurrence position, and based on the separation degree between the first occurrence position within the partial region and the second occurrence position outside the partial region not being within the predetermined separation criterion, set a second partial region including the second occurrence position outside the partial region as a second surveillance region, and output a video of the second surveillance region to a second virtual channel.

The at least one processor may be further configured to: determine an importance of the event, and adjust at least one of the size of the surveillance region and the position of the surveillance region based on the occurrence position and the importance of the detected event.

The at least one processor may be further configured to: perform the at least one operation among moving the surveillance region, enlarging the surveillance region, and reducing the surveillance region to include an occurrence position at which an event of a predetermined importance, among a plurality of events of which importances have been determined, has occurred.

The operation of moving the surveillance region may include moving the surveillance region to include both the first occurrence position within the partial region and the second occurrence position outside the partial region to be output to the virtual channel, where the operation of enlarging the surveillance region includes enlarging the surveillance region to include the first occurrence position within the partial region and the second occurrence position outside the partial region to be output to the virtual channel based on the first occurrence position within the partial region and the second occurrence position outside the partial region not being output to a same virtual channel due to the movement of the surveillance region, and where the operation of reducing the surveillance region includes reducing the surveillance region based on the first occurrence position and the second occurrence position being included in a region smaller than the surveillance region corresponding to the partial region.

The at least one processor may be further configured to: determine the importance of the detected event based on at least one of: a user selection, whether the event occurs at a preset time, whether the event occurs in a preset region, based on the detected event corresponding to a detected object, a type of information of the detected object, and based on the detected event corresponding to the detected object, movement information of the detected object.

The detected event occurring in the panoramic video may include a first object within the partial region, and a second object outside the partial region, where the at least one processor is further configured to: based on a separation degree between the first object and the second object being within a predetermined separation criterion, perform at least one operation among moving the surveillance region, enlarging the surveillance region, and reducing the surveillance region to include both the first object and the second object, and based on the separation degree between the first object and the second object not being within the predetermined separation criterion, set a partial region including the first object as the surveillance region, output a video of the surveillance region to the virtual channel, set a second partial region including the second object as a second surveillance region, and output a video of the second surveillance region to a second virtual channel.

The at least one processor may be further configured to: based on the separation degree between the first object and the second object being within the predetermined separation criterion, set a partial region including both the first object and the second object as a third surveillance region and outputs video for the third surveillance region to the virtual channel.

The at least one processor may be further configured to: determine a type of the detected event and a type of object within the detected event, generate a surveillance region corresponding to the type of the detected event and the type of object within the event, and output a video of the generated surveillance region to a respective virtual channel.

According to an aspect of the disclosure, provided is a method for setting a surveillance region by a panoramic surveillance video generating apparatus, the method may include: obtaining a plurality of surveillance videos through a plurality of image sensors; generating a panoramic video by combining the plurality of surveillance videos; detecting an event occurring within the panoramic video; setting a partial region of the panoramic video as a surveillance region; adjusting the surveillance region comprising adjusting at least one of a quantity of the surveillance region, a size of the surveillance region, and a position of the surveillance region based on an event detection result; and outputting a video of the surveillance region to a virtual channel.

The method may further include detecting an occurrence position of the detected event, where the adjusting the surveillance region further includes: adjusting the at least one of the quantity of the surveillance region, the size of the surveillance region, and the position of the surveillance region based on the occurrence position of the detected event.

The detecting the event occurring in the panoramic video may include detecting a first event within the partial region and a second event outside the partial region, where the adjusting the at least one of the quantity of the surveillance region, the size of the surveillance region, and the position of the surveillance region based on the occurrence position of the detected event includes: based on a separation degree between a first occurrence position at which the first event occurs within the partial region and a second occurrence position at which the second event occurs outside the partial region being within a predetermined separation criterion, performing at least one operation among moving the surveillance region, enlarging the surveillance region, and reducing the surveillance region to include the second occurrence position, and based on the separation degree between the first occurrence position within the partial region and the second occurrence position outside the partial region not being within the predetermined separation criterion, setting a second partial region including the second occurrence position outside the partial region to a second surveillance region, a video of the second surveillance region being output to a second virtual channel.

The adjusting the surveillance region based on the event detection result may include: determining an importance of the detected event, and adjusting at least one of the size of the surveillance region and the position of the surveillance region based on the occurrence position and the importance of the detected event.

The adjusting the at least one of the size of the surveillance region and the position of the surveillance region based on the occurrence position and the importance of the detected event may include performing at least one operation among moving the surveillance region, enlarging the surveillance region, and reducing the surveillance region to include an occurrence position at which an event of a predetermined importance, among a plurality of events whose importances have been determined, has occurred, where the operation of moving the surveillance region includes moving the surveillance region to include both the first occurrence position within the partial region and the second occurrence position outside the partial region to be output to the virtual channel, where the operation of enlarging the surveillance region comprises enlarging the surveillance region to include the first occurrence position within the partial region and the second occurrence position outside the partial region to be output to the virtual channel based on the first occurrence position within the partial region and the second occurrence position outside the partial region not being output to a same virtual channel due to the movement of the surveillance region, and where the operation of reducing the surveillance region comprises reducing the surveillance region based on the first occurrence position and the second occurrence position being included in a region smaller than the surveillance region corresponding to the partial region.

The determining the importance of the detected event may be based on at least one of: whether a user selects the detected event, whether the event occurs at a preset time, whether the event occurs in a preset region, based on the detected event corresponding to a detected object, type information of the detected object, and based on the detected event corresponding to the detected object, movement information of the detected object.

The detecting the event occurring in the panoramic video may include detecting a first object within the partial region and a second object outside the partial region, where the adjusting the at least one of the quantity of the surveillance region, the size of the surveillance region, and the position of the surveillance region based on the occurrence position of the detected event includes: performing at least one operation among moving the surveillance region, enlarging the surveillance region, and reducing the surveillance region to include both the first object and the second object, based on a separation degree between the first object and the second object being within a predetermined separation criterion based on a result of determining the occurrence position of the detected event, and setting a partial region including the first object as the surveillance region, a video of the surveillance region being output to the virtual channel, setting a second partial region including the second object as a second surveillance region, and a video of the second surveillance region being output to a second virtual channel, based on the separation degree between the first object and the second object not being within the predetermined separation criterion.

The adjusting the at least one of the quantity of the surveillance region, the size of the surveillance region, and the position of the surveillance region based on the occurrence position of the detected event may include: setting a region including both the first object and the second object as a third surveillance region, and a video of the third surveillance region being output to the virtual channel, based on the separation degree between the first object and the second object being within the predetermined separation criterion.

The setting the partial region based on an event detection result may include: determining a type of the detected event and a type of object within the event; and generating a surveillance region corresponding to the type of the detected event and the type of object within the event, where a video of the generated surveillance region is output to a respective virtual channel.

According to an aspect of the disclosure, a panoramic surveillance camera may include: a plurality of image sensors configured to acquire a plurality of surveillance videos; and at least one processor configured to: generate a panoramic video by combining the plurality of surveillance videos, set a partial region of the panoramic video as a surveillance region, and output a video of the surveillance region as a virtual channel, where the at least one processor is configured to: detect an event occurring within the panoramic video, and adjust at least one of a quantity of the surveillance region, a size of the surveillance region, and a position of the surveillance region output to the virtual channel based on an event detection result.

The at least one processor may be further configured to: detect a plurality of events occurring within the panoramic video corresponding to a plurality of objects, detect movements of the plurality of objects within the panoramic video, set one or more partial regions of the panoramic video as one or more surveillance regions, respectively, where, based on a separation degree between the one of the plurality of objects and another of the plurality of objects being within a predetermined separation criterion, one partial region including the one of the plurality of objects and the another of the plurality of objects is set as the surveillance region and is output as a video to the virtual channel, and where, based on the separation degree between the one of the plurality of objects and the another of the plurality of objects not being within the predetermined separation criterion, a first partial region including the one of the plurality of objects is set as a first surveillance region and output as a video to a first virtual channel, and a second partial region including the another of the plurality of objects is set as a second surveillance region and output as a video to a second virtual channel, and dynamically adjust the one or more surveillance regions based on the detected movements of the plurality of objects within the panoramic video according to the separation degree relative to the predetermined separation criterion.

BRIEF DESCRIPTION OF DRAWINGS

The following drawings attached to this specification illustrate embodiments of the present disclosure and serve to further understand the technical idea of the present disclosure along with specific details for carrying out the present disclosure. Therefore, the present disclosure should not be interpreted as being limited to the details described in the drawings. The above and other aspects, features, and advantages of certain embodiments of the present disclosure will be more apparent from the following description taken in conjunction with the accompanying drawings, in which:

6

Figure 1:
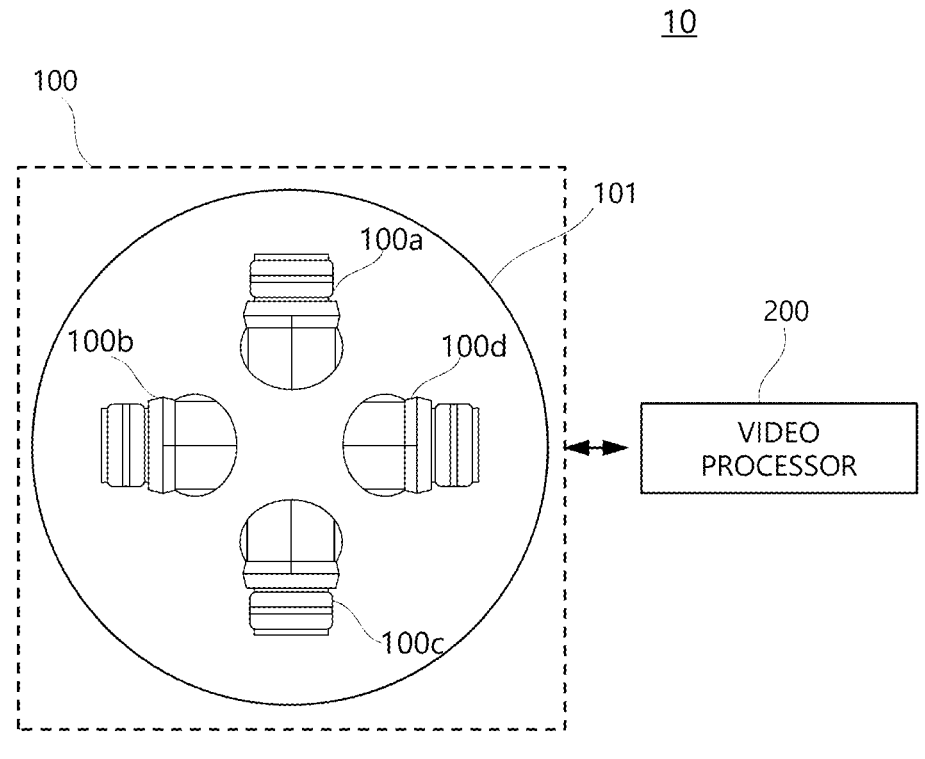
Figure 2:
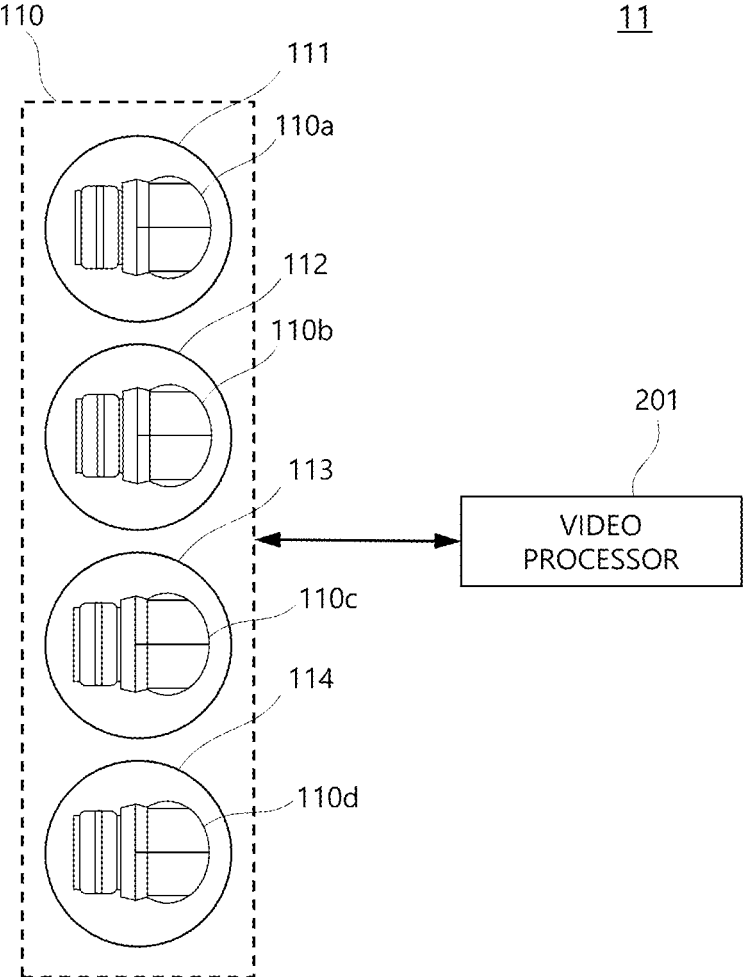
Figure 3:
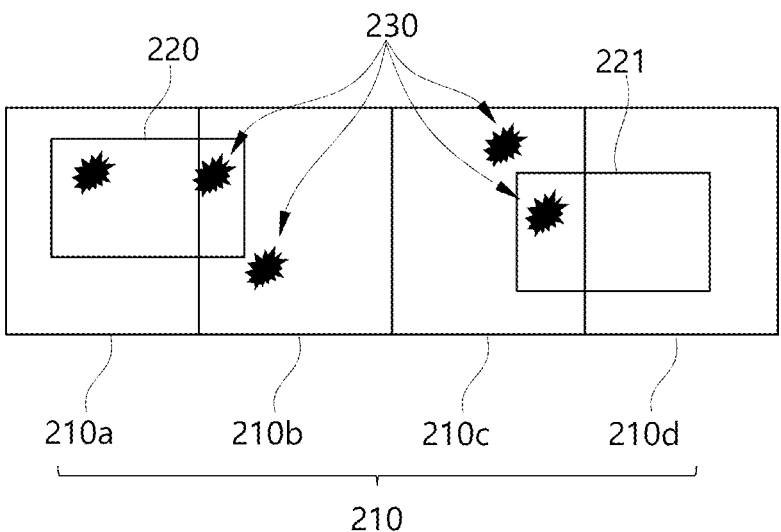
Figure 4:
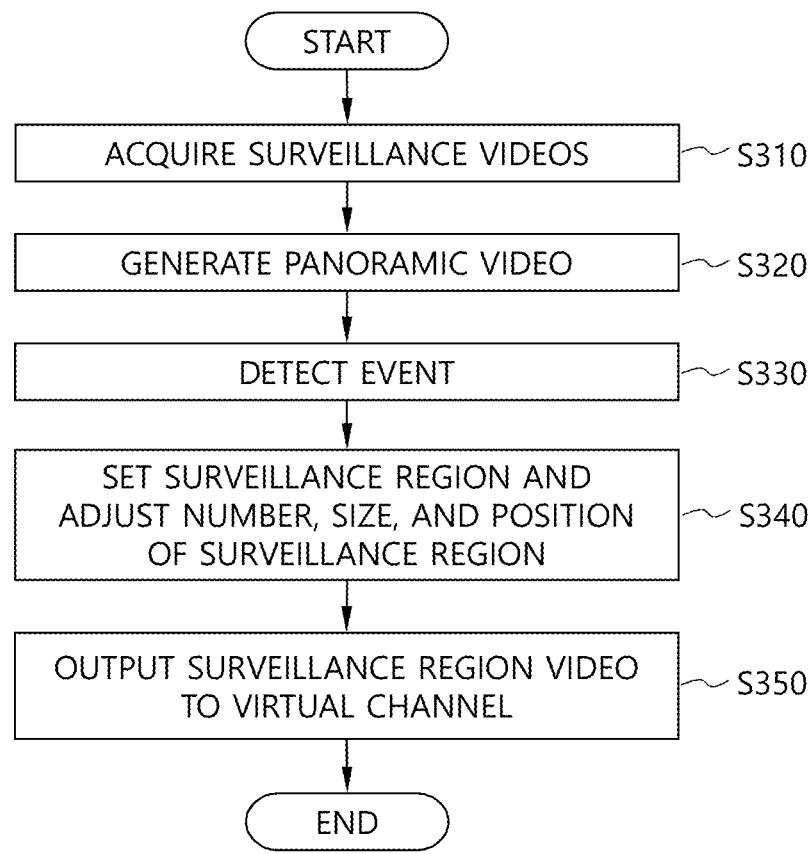
Figure 10:
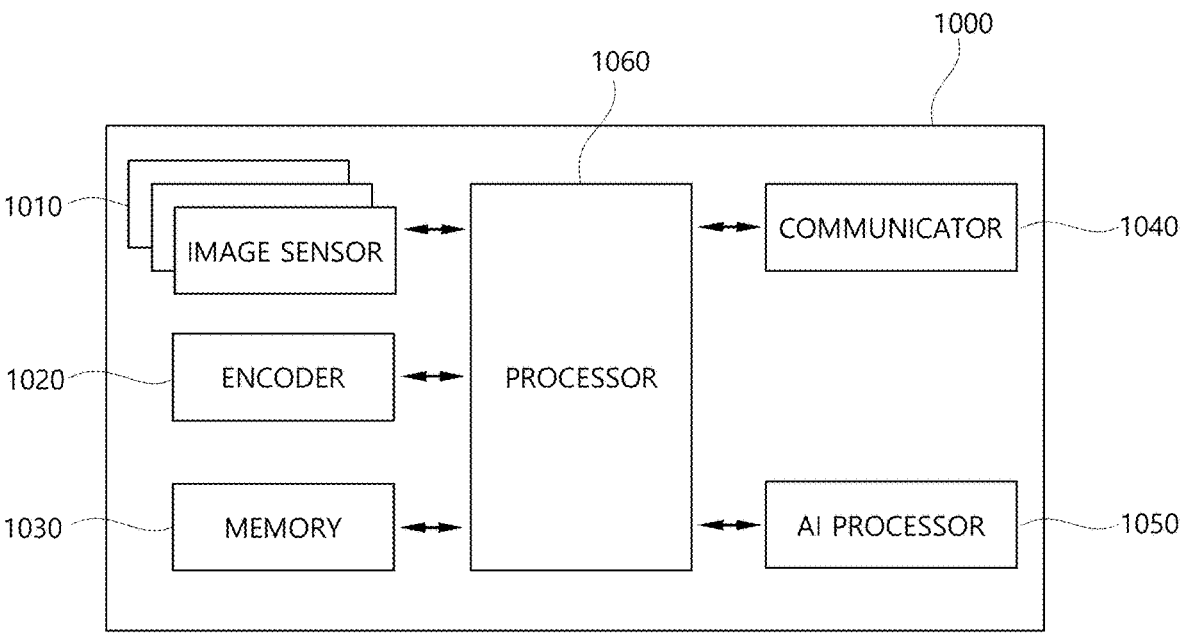
Figure 11:
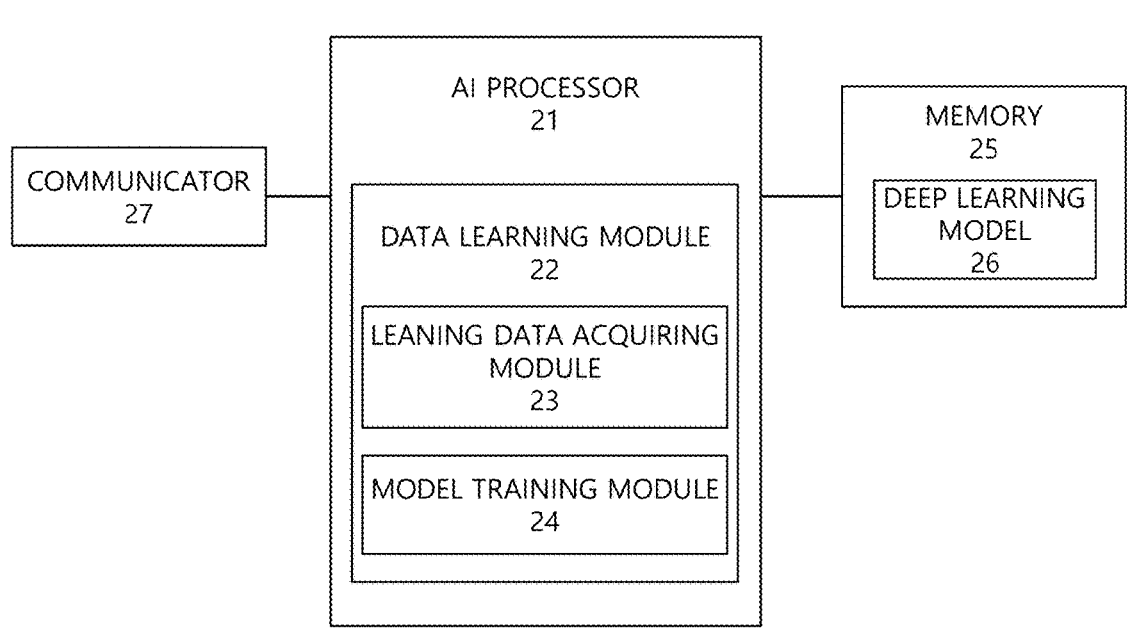

FIG. 1 and FIG. 2 schematically illustrate a panoramic surveillance video generating device according to an embodiment;

FIG. 3 illustrates an example of a panoramic surveillance video output by a panoramic surveillance video generating device according to an embodiment;

FIG. 4 is a flowchart illustrating an operation of a panoramic surveillance video generating device according to an embodiment;

FIG. 5A, FIG. 5B, FIG. 5C, FIG. 6A, FIG. 6B, FIG. 6C, FIG. 7A, FIG. 7B, FIG. 8A, FIG. 8B, FIG. 8C, and FIG. 8D are diagrams illustrating various examples of adjusting the number, size, and position of surveillance regions in a panoramic video based on event detection results according to an embodiment;

FIG. 9 is a schematic block diagram of a panoramic surveillance video generating device according to an embodiment;

FIG. 10 is a schematic block diagram of a panoramic surveillance camera according to another embodiment; and FIG. 11 is a diagram illustrating an AI processing unit applied to analysis of a panoramic video according to an embodiment.

DETAILED DESCRIPTION

The technology disclosed in this specification may be applied to surveillance cameras or surveillance camera systems. However, the technology disclosed in this specification is not limited thereto and may be applied to all devices and methods to which the technical idea of the technology may be applied.

Technical terms used in this specification are used to merely illustrate specific embodiments, and should be understood that they are not intended to limit the present disclosure. The terms used herein including technical or scientific terms may have the same meaning as those generally understood by an ordinary person skilled in the art to which the present disclosure pertains. In addition, if a technical term used in the description of the present disclosure is an erroneous term that fails to clearly express the idea of the present disclosure, it should be replaced by a technical term that may be properly understood by the skilled person in the art. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise.

In describing the present disclosure, if a detailed explanation for a related known function or construction is considered to unnecessarily divert the gist of the present disclosure, such explanation may be omitted but may still be understood by those skilled in the art. The accompanying drawings are used to help easily understand the technical idea of the present disclosure, and the present disclosure may not be limited by the accompanying drawings.

Videos according to an embodiment of the present disclosure may include still images, moving images, and the like.

FIGS. 1 to 2 schematically illustrate various embodiments of a panoramic surveillance video generating device.

Referring to FIG. 1, a panoramic surveillance video generating device 10 according to an embodiment of the present specification may include a video capturing device 100 and a video processor 200.

The video capturing device 100 may be an electronic device for imaging located at a fixed position in a specific position, such as a surveillance target position. As shown, the video capturing device 100 may be configured as a single panoramic camera device 101 in which a plurality of camera modules 100a, 100b, 100c, and 100d, each equipped with an image sensor, are provided in one device housing.

Referring to FIG. 2, a panoramic surveillance video generating device 11 according to an embodiment of the present specification may include a video capturing device 110 and a video processor 201.

The video capturing device 101 may be a plurality of electronic devices for imaging that are disposed at positions in which a plurality of surveillance regions adjacent to each other may be imaged with respect to the surveillance target position. The video capturing device 101 may be configured by grouping a plurality of camera devices 111, 112, 113, and 114 respectively including one image sensor or camera module 110a, 110b, 110c, and 110d in an individual housing.

In FIGS. 1 and 2, the plurality of camera modules 100a, 100b, 100c, and 100d or the plurality of camera devices 111, 112, 113, and 114 may each capture a monitored region as a video or still image.

The camera modules 100a, 100b, 100c, and 100d and the camera modules 110a, 110b, 110c, and 110d constituting the panoramic camera device 101 and the camera devices 111, 112, 113, and 114 may have the same configuration and functions. Hereinafter, video capturing will be described in detail with reference to the video capturing device 100 of FIG. 1.

Referring back to FIG. 1, the video capturing device 100 may be a network camera connected to the Internet wiredly or wirelessly to be used. Each of the plurality of camera modules 100a, 100b, 100c, and 100d constituting the video capturing device 100 may be a PTZ camera having panning, tilting, and zooming functions. The plurality of camera modules 100a, 100b, 100c, and 100d may be cameras including lenses and image sensors. The lens may be a lens group including one or more lenses. An image sensor may convert a video input by a lens into an electrical signal. For example, an image sensor may be a semiconductor device, such as a charge-coupled device (CCD) or complementary metal oxide semiconductor (CMOS) that may convert optical signals into electrical signals (described as video below). The video capturing device 100 may provide a video including RGB, an infrared video, or a distance video including distance information for the space to be captured. The video capturing device 100 may have a function of recording sounds occurring in the monitored region. The video capturing device 100 may have a function of generating a notification, recording a video, or capturing a still image when a change, such as movement or sound, occurs in the monitored region.

The video processor 200 may be a device that receives a video captured through the video capturing device 100 and/or a video acquired by editing the corresponding video and processes the same for a specified purpose. The video processor 200 may edit the received video data to generate one panoramic surveillance video.

FIG. 3 illustrates an example of a panoramic surveillance video output by a panoramic surveillance video generating device.

Referring to FIG. 3, the video processor 200 may combine the videos 210a, 210b, 210c, and 210d acquired by the plurality of camera modules 100a, 100b, 100c, and 100d to generate and output one panoramic surveillance video 210, and may designate a certain portion within the panoramic surveillance video 210 as separate surveillance regions 220 and 221, and output the same. Video data corresponding to the surveillance regions 220 and 221 may be output through a virtual channel. The virtual channel refers to a separate video channel that is distinct from a panoramic video channel that outputs the panoramic surveillance video 210. The video processor 200 may generate a profile for a panoramic video to be output to the panoramic video channel, and generate profiles for videos of the surveillance regions 220 and 221 to be output to a virtual channel. Here, the video processor 200 may generate a plurality of virtual channels and a plurality of video profiles when there are a plurality of surveillance regions. Virtual channels may be referred to by various names, such as crop channels or surveillance channels.

The video processor 200 may detect the occurrence of an event by analyzing the video data received from the video capturing device 100. For example, the video processor 200 may detect the occurrence of an event in a video using an event detection algorithm and determine the type and position of the event. In addition, the video processor 200 may detect an object in the video using an object detection algorithm and determine the type of the object. The event detection algorithm or the object detection algorithm may be an AI-based algorithm and may detect the occurrence of an event or detect an object by applying a pre-trained artificial neural network model.

In the panoramic surveillance video 210, the occurrence of the event and the position 230 of the event may be detected, as shown in FIG. 3, which may be detected regardless of the detection regions 220 and 221. In this case, surveillance efficiency may deteriorate due to a gap between the preset detection regions 220 and 221 and the position of a new event occurring outside the detection regions 220 and 221.

The video processor 200 may store various learning models suitable for video analysis purposes. In addition to the learning models for event occurrence detection and object detection described above, a model capable of calculating a movement speed of the detected object or determining the amount of movement of the object may be stored. The video processor 200 may perform event occurrence detection and object detection within the panoramic surveillance video 210, and may adjust the size and position of the detection regions 220 and 221 based on the detection results to increase surveillance efficiency.

According to an embodiment, an event detection operation or object detection operation by the artificial neural network model may be performed by the video processor 200 and/or may also be performed by an AI module included in a camera module constituting the video capturing device 100, an AI module included as a component of NVR, or an AI box separated from the video capturing device 100 and the video processor 200.

The video capturing device 100 and the video processor 200 may be provided in the same housing and implemented as a single panoramic imaging device. In this case, the panoramic imaging device may capture videos from each camera module, merge the captured videos to generate a panoramic video signal, and also generate a video for a separately set surveillance region, and then output these videos to the outside.

The panoramic surveillance video generating device 10 or some components thereof may be connected to a video security solution, such as a digital video recorder (DVR), central management system (CMS), network video recorder (NVR), and video management system (VMS) to transfer video data or may be included as some component of the video security solution.

The panoramic surveillance video generating device 10 may be connected to a display device that may output a panoramic video and a virtual channel video by performing wired and wireless communication with the video processor 200.

Communication networks, which are wired and wireless communication paths, between the panoramic surveillance video generating device 10 and the display device 300, may include, for example, wired networks, such as local area networks (LANs), wide area networks (WANs), metropolitan area networks (MANs), and integrated service digital networks (ISDNs) or wireless networks, such wireless LANs, CDMA, Bluetooth™, and satellite communications, but the scope of the present specification is not limited thereto.

FIG. 4 is a flowchart illustrating an operation of a panoramic surveillance video generating device according to an embodiment.

The panoramic surveillance video generation device 10 according to an embodiment disclosed herein may generate a panoramic video by combining videos captured through the video capturing device 100, and then adjust the number, size and position of separately designated surveillance regions based on event detection results in the panoramic video.

FIGS. 5A-5C, 6A-6C, 7A-7B and 8A-8D are diagrams illustrating various examples of adjusting the number, size, and position of surveillance regions in a panoramic video based on event detection results.

Referring to FIGS. 1 and 4, first, the panoramic surveillance video generating device 10 may acquire a plurality of surveillance videos through the plurality of camera modules 100a, 100b, 100c, and 100d of the video capturing device 100 (S310). The camera modules 100a, 100b, 100c, and 100d may acquire video data by dividing the entire surveillance region by the number of camera modules in order to acquire surveillance video in a panoramic form. The quantity of camera modules may be determined depending on the angle of view of the camera modules, and as the angle of view of each camera module is greater, the number of required camera modules is reduced.

Next, the panoramic surveillance video generating device 10 may generate a panoramic video by combining a plurality of surveillance videos acquired by the video capturing device 100 (S320). The panoramic surveillance video generating device 10 may generate one panoramic video representing the entire surveillance region through methods, such as matching and stitching the plurality of acquired surveillance videos, may transmit all of the generated panoramic video data to the display device, and may output the same on a large screen.

The panoramic surveillance video generating device 10 may simultaneously detect an event that occurs within the panoramic video, when outputting the panoramic video (S330), may set a partial region in which an event occurs within the panoramic video as a surveillance region, and may adjust at least one of the number, size, and position of the surveillance regions based on an event detection result (S340). The panoramic surveillance video generating device 10 may output a video of the partial region of the entire panoramic video set as a surveillance region to a virtual channel. At this time, video data for the portion set as the surveillance region may be output to the display device through a separate virtual channel. The position and size of the surveillance region may be adjusted manually by user operation or automatically by a predetermined control signal. The panoramic surveillance video generating device 10 may output the panoramic video for the entire surveillance region and the video for the partial region of the panoramic video to different displays, or may output both videos as divided videos within one display that outputs the panoramic video. When the panoramic video and the video of the surveillance region are output simultaneously within one display, the video of the surveillance region may be output in a picture-in-picture (PIP) form in a certain position within the entire panoramic video, or may be output in the PIP form as an enlarged or highlighted video by superimposing the video of the surveillance region in a position in which an event has occurred within this entire panoramic video.

The operation of setting the partial region of the panoramic video as a surveillance region and adjusting at least one of the size and position of the surveillance region based on the event detection result may be an operation in which the panoramic surveillance video generating device 10 detects the position at which the occurrence of an event is detected in the entire panoramic video, and then adjusts at least one of the number, size, and position of the surveillance region based on the position of the detected event. The panoramic surveillance video generating device 10 may determine whether an event occurs in a position outside the partial region set as a surveillance region. When it is determined that an event occurs in a position outside the partial region, and the separation degree between the event occurrence position within the partial region and the event occurrence position outside the partial region is included in a separation criterion, the panoramic surveillance video generating device 10 may perform at least one of moving, enlarging, and reducing the surveillance region so that the surveillance region includes the event occurrence position outside the partial region. When it is determined that an event occurs in a position outside the partial region, and the separation degree between the event occurrence position within the partial region and the event occurrence position outside the partial region is not included in the separation criterion, the panoramic surveillance video generating device 10 may output the video of the new surveillance region to a new virtual channel.

The separation degree between event occurrence positions within the panoramic video may be expressed as a distance between event occurrence positions. Referring to FIGS. 1 and 5A-5C, for example, the separation degree may be expressed as a distance between panoramic regions in which events occurred in the panoramic regions 500a, 500b, 500c, and 500d of the panoramic video acquired by the plurality of camera modules 100a, 100b, 100c, and 100d of the video capturing device 100. In this case, the separation criterion may be determined based on whether event occurrence positions are included in neighboring panorama regions. Accordingly, the case in which the separation degree between the event occurrence position within the partial region and the event occurrence position outside the partial region is included in the separation criterion may be a case in which the event occurrence position within the partial region and the event occurrence position outside the partial region exist in panoramic regions adjacent to each other, and the case in which the separation degree between the event occurrence position within the partial region and the event occurrence position outside the partial region is not included in the separation criterion may be a case in which the event occurrence position within the partial region and the event occurrence position outside the partial region exist in panoramic regions that are not adjacent to each other. However, the specification is not limited thereto.

FIG. 5A illustrates a state in which an event occurs in a panoramic region 500a within a panoramic video. A certain region including the event occurrence position is set as a surveillance region 510, and a video for the surveillance region is output as a virtual channel. FIG. 5B illustrates a state in which a new event 520 occurs in a panoramic region 500b in addition to the panoramic region 500a in the panoramic video. Since the occurrence position of the existing event and the occurrence position of the new event are adjacent to each other based on the panoramic regions, the panoramic surveillance video generating device 10 may enlarge the existing surveillance region 510, set a certain region including all the event occurrence positions to a new surveillance region 510-1, and output a video for the new surveillance region 510-1 to a virtual channel. FIG. 5C illustrates a state in which a new event 531 occurs in a panoramic region 500c in addition to the panoramic region 500a in the panoramic video. Since the occurrence position of the existing event and the occurrence position of the new event are not adjacent to each other based on the panoramic regions, the panoramic surveillance video generating device 10 may set a new certain region including the new event occurrence positions as a new surveillance region 530, and output the video for the new surveillance region 510-1 to a new virtual channel.

Hereinafter, an operation of moving, enlarging, and reducing a surveillance region to allow the surveillance region to include an event occurrence position outside a partial region when the separation degree between the event occurrence position within the partial region and the event occurrence position outside the partial region is included in the separation criterion is described. For example, the operation of moving the surveillance region may be moving the surveillance region so that both an event occurrence position within the partial region and the event occurrence position outside the partial region are output to the virtual channel. The operation of enlarging the surveillance region may be enlarging the surveillance region so that the event occurrence positions within and outside the partial region are output to the virtual channel when both the event occurrence position within the partial region and the event occurrence position outside the partial region are not output to the virtual channel due to the movement of the surveillance region. The operation of reducing the surveillance region may be reducing the surveillance region so that the event occurrence positions are output to the virtual channel when the event occurrence positions are all included in a surveillance region smaller than the surveillance region having the same size as the partial region.

In the embodiment of FIGS. 5A, 5B, and 5C, although the separation criterion for the event occurrence position is divided into panoramic regions 500a, 500b, 500c, and 500d acquired from the plurality of camera modules 100a, 100b, 100c, and 100d constituting the entire panoramic video, the standard may be a virtual division zone dividing the entire panoramic video, rather than the panoramic regions acquired from the camera modules according to an embodiment. For example, the entire panoramic video may be divided into 4 parts in a horizontal direction and 2 parts in a vertical direction to obtain 8 panoramic regions of 4×2 or may be divided into 8 parts in the horizontal direction and 3 parts in the vertical direction to obtain 24 panoramic regions of 8×3, and the separation degree of the event occurrence positions may be determined by whether an event occurs in a panoramic region neighboring in the horizontal or vertical direction.

The size of one surveillance region, that is, the size of the video output to the virtual channel, may be determined at a preset ratio compared to the size of the entire panoramic video. For example, the size of the video output to one virtual channel may be at least 5% of the total panoramic video size and may be set to not exceed a maximum of 50%.

The panoramic surveillance video generating device 10 may determine whether an event occurs using motion detection, video analytics, and face detection.

FIG. 6A illustrates an example of only moving the position without changing the size of the surveillance region according to an event detection result. The left side illustrates before moving the surveillance region, and the right side illustrates after moving the surveillance region. Referring to FIG. 6A, there may be a preset surveillance region 620 within a panoramic video 610, and when positions in which an event occurs is displayed, such as points 630 and 640 in the drawing, events may be classified as the event 630 that occurs in the position within the surveillance region 620, and the event 640 that occurs in the position outside the surveillance region 620. Here, when it is determined that all the positions of the events may be included in the surveillance region 620 by adjusting (moving) only the position of the surveillance region 620 and without adjusting the size of the surveillance region 620, the panoramic surveillance video generating device 10 may move the surveillance region 620 as shown in the right side of FIG. 6A.

FIG. 6B illustrates an example of changing the size of the surveillance region, that is, enlarging the surveillance region, according to an event detection result. The left side illustrates the surveillance region before enlargement, and the right side illustrates the surveillance region after enlargement. Referring to FIG. 6B, when there is a preset surveillance region 620 within the panoramic video 610 and positions in which an event occurs are displayed as points 631 and 641 in the drawing, the events may be classified as the event 631 that occurs in the position within the surveillance region 620 and the event 641 that occurs in the position outside the surveillance region 620. Here, when it is determined that all the positions of the events that occur cannot be included in the surveillance region 620 by adjusting the position of the surveillance region 620, the panoramic surveillance video generating device 10 may enlarge the surveillance region 620 as shown on the right side of FIG. 6B to include all the events that occur in the surveillance region 620.

FIG. 6C illustrates another example of changing the size of the surveillance region according to an event detection result, that is, an example of reducing the surveillance region. The left side illustrates the surveillance region before reduction, and the right side illustrates the surveillance region after reduction. Referring to FIG. 6C, when there is a preset surveillance region 620 within the panoramic video 610, and positions in which an event occurs are displayed such as points 632 and 642 in the drawing, the events may be classified as the event 632 that occurs in a position within the surveillance region 620 and the event 642 that occurs in a position outside the surveillance region 620. Here, when it is determined that all the positions of the events that occur in the reduced-sized surveillance region 620, the panoramic surveillance video generating device 10 may move and reduce the surveillance region 620 as shown on the right side of FIG. 6C.

In addition, the panoramic surveillance video generating device 10 may determine not only the occurrence position of the detected event but also the importance of the detected event, and then adjust at least one of the size and position of the surveillance region based on the occurrence position and importance of the event. For example, the panoramic surveillance video generating device 10 may perform at least one operation of moving, enlarging, and reducing the surveillance region to include the position in which the event of predetermined importance occurs among the events whose importance has been determined. A method of determining the importance of a detected event may include at least one of a method of identifying the importance of an event based on whether a user selects the detected event, a method of identifying the importance of an event based on whether the event occurs at a preset time, a method of identifying the importance of an event based on whether the event occurs in a preset region, a method of identifying the importance of an event based on type information of a detected object, and a method of identifying the importance of an event based on movement information of a detected object may be used.

As an example of the method of identifying the importance of an event based on whether the event occurs at a preset time, the panoramic surveillance video generating device 10 may assign importance A to an event that occurs within a specific time range set by the user, assign importance B to an event that occurs within 1 hour before or after the set specific time range, and assign importance C to an event that occurs at other times. As an example of the method of identifying the importance of an event based on whether the event occurs in a preset region, the panoramic surveillance video generating device 10 may assign the importance A to an event that occurs in a specific region set by the user, assign the importance B to an event that occurs in a certain region outside the set specific region, and assign the importance C to an event that occurs in other regions.

As an example, the method of identifying the importance of an event based on type information of a detected object may be applied when the panoramic surveillance video generating device 10 uses an intelligent surveillance camera capable of distinguishing between subjects. When it is determined that an object detected in the panoramic video is a person, the panoramic surveillance video generating device 10 may assign the importance A to the event in which the object is detected, when it is determined that an object detected in the panoramic video is a vehicle, the panoramic surveillance video generating device 10 may assign the importance B to the event in which the object is detected, and when it is determined that an object detected in the panoramic video is an unimportant object or animal, the panoramic surveillance video generating device 10 may assign the importance C to the event in which the object is detected. In addition, when the object detected in the event is a person and the detected person is recognized as a dangerous person through face recognition, the panoramic surveillance video generating device 10 may assign the importance A to the corresponding event, when the detected person is recognized as a pre-registered person, the panoramic surveillance video generating device 10 may assign the importance B to the corresponding event, and when the detected person is recognized as an outsider (stranger), the panoramic surveillance video generating device 10 may assign the importance A to the corresponding event.

As an example of the method of identifying the importance of an event based on the motion information of a detected object, the panoramic surveillance video generating device 10 may identify and assign the importance of an event according to a predetermined amount of movement according to an algorithm that determines the amount of movement of an object in the panoramic video.

FIG. 7A illustrates an example of only moving a position without changing the size of a surveillance region according to an event detection result. The left side illustrates before moving the surveillance region, and the right side illustrates after moving the surveillance region. FIG. 7B illustrates an example of changing the size of the surveillance region, that is, reducing the surveillance region, according to an event detection result. The left side illustrates the surveillance region before reduction, and the right side illustrates the surveillance region after reduction.

Referring to FIGS. 7A-7B, the panoramic surveillance video generating device 10 may display the positions in which an event occurs within a panoramic video 710 and the importances A, B, and C of the event that occurs at the corresponding positions as shown in the drawing. The panoramic surveillance video generating device 10 may classify and display the importances of events at each position as A, B, C, etc. (the importances decrease in alphabetical order) according to the method of identifying the importances of the events described above. According to the user's setting, if the user instructs to set the position in which an event of importance B or higher (events of importance A and B) occurs as a surveillance region, the panoramic surveillance video generating device 10 may move the preset surveillance region 720 to a new surveillance region 721 as shown in FIG. 7A. As another example, if the user instructs to set the position in which only the event of importance A occurs as the surveillance region, the panoramic surveillance video generating device 10 may move and reduce the preset surveillance region 720 to a new surveillance region 722 and set only the position in which the event of importance A occurs as a surveillance region and output the same to a virtual channel, as shown in FIG. 7B.

Referring back to FIG. 4, the panoramic surveillance video generating device 10 may output the video of the surveillance region in which at least one of the number, size, and position of the surveillance region has been adjusted to the virtual channel described above (S350), thereby adjusting the surveillance region according to the event detection result and improving the surveillance efficiency.

Based on the result of determining the occurrence position of the detected event, if the separation degree between the first and second objects in the surveillance region is included in the predetermined separation criterion, the panoramic surveillance video generating device 10 may perform at least one of the operations of moving, enlarging, or reducing the surveillance region so that the surveillance region includes both the first object and the second object different from each other. If the separation degree between the first and second objects in the surveillance region is not included in the predetermined separation criterion, the panoramic surveillance video generating device 10 may set the event occurrence position including the first object to the surveillance region, output the video of the surveillance region to the existing virtual channel, set the event occurrence position including the second object to a new surveillance region, and output a video of the new surveillance region to a new virtual channel. However, if the first object in the existing surveillance region and the second object in the new surveillance region move again to be closer to each other, that is, if the separation degree between the two objects is included in the predetermined separation criterion, the panoramic surveillance video generating device 10 may set a region including both the event occurrence position including the first object and the event occurrence position including the second object as a surveillance region, output the video for the surveillance region to one of the existing virtual channel and the new virtual channel, and delete a virtual channel through which a video is not output. In other words, the surveillance video may be output variably by separating or deleting a virtual channel according to the distance between objects in the surveillance region.

FIGS. 8A-8D illustrate an example of a method for tracking objects within a preset surveillance region, separating or combining the surveillance region depending on the separation degree of the objects, and outputting the same to a virtual channel, thereby precisely tracking and monitoring objects. FIG. 8A illustrates an example of tracking movement of objects in a surveillance region output to virtual channel 1, FIG. 8B illustrates an example of generating a separate virtual channel 2, separating a surveillance region, and outputting a surveillance video, when objects in the surveillance region output to the existing virtual channel 1 are separated, FIG. 8C illustrates an example of tracking movement of objects in the videos of a surveillance region that are output separately to virtual channel 1 and virtual channel 2, and FIG. 8D illustrates an example of destroying the existing virtual channel 1 and outputting a surveillance video only to the virtual channel 2, when an object in the surveillance region output to the virtual channel 1 and an object in the surveillance region output separately to the virtual channel 2 are close to each other. A separation distance between objects, which is a reference for separating virtual channels, may be predetermined as a relative reference distance compared to the entire panoramic video size and may be determined depending on whether an object is detected in a neighboring panoramic region among the panoramic regions constituting the panoramic video as described above.

In addition, the panoramic surveillance video generating device 10 may set a partial region of the panoramic video as a surveillance region and adjust at least one of the number, size, and position of the surveillance region based on an event detection result. The panoramic surveillance video generating device 10 may determine the type of the detected event and the type of object within the event, generate a surveillance region corresponding to each type of the detected event and each type of object within the event, and output a video for the surveillance region for each of the generated surveillance regions to a virtual channel. For example, if the type of event is face detection or motion detection, the panoramic surveillance video generating device 10 may output the surveillance region corresponding to face detection to virtual channel 1 and output the surveillance region corresponding to motion detection to virtual channel 2. In addition, for example, if the type of object in the event is a person, the panoramic surveillance video generating device 10 may output the surveillance region in which the person was detected to virtual channel 3, and if the type of object in the event is a vehicle, the panoramic surveillance video generating device 10 may identify and output the surveillance region in which the vehicle was detected to virtual channel 4.

Video analysis related to the event, such as detecting the occurrence of an event, determining the position of the event, determining the importance of the event, and detecting an object, by the panoramic surveillance video generating device 10 described above may be performed using an artificial intelligence processor provided inside or outside the panoramic surveillance video generating device 10.

In addition, the panoramic surveillance video generating device 10 may delete a virtual channel after the lapse of a certain period of time after the virtual channel is generated. Generation or deletion of a virtual channel may be determined based on the type of detected event, frequency of occurrence, intensity of occurrence, and retention time of the event. If virtual channels are frequently generated or deleted due to the frequent occurrence and disappearance of events, there may be difficulties in operating the surveillance system. Therefore, virtual channels may be generated only when the intensity of the event is strong, the frequency of occurrence is high, and the retention time after the occurrence of the event is long. In addition, the retention time of the generated virtual channel may be maintained for several minutes to several hours depending on user settings. The intensity of the event, frequency of occurrence, retention time after an occurrence of the event, etc. may be set to values predetermined by the user.

FIG. 9 is a schematic block diagram of a panoramic surveillance video generating device according to an embodiment.

A panoramic surveillance video generating device 900 may include a video capturing device 910 and a video processor 920, the video capturing device 910 may include a plurality of camera modules 910a, 910b, 910c, and 910d, and the video processor 920 may include a panoramic video generator 921, an event detector 922, and a surveillance region setter 923. The panoramic surveillance video generator 900, the video capturing device 910, and the video processor 920 may correspond to the panoramic surveillance video generating devices 10 and 11, the video capturing devices 100 and 110, and the video processor 200 and 201, respectively, described above with reference to FIGS. 1 and 2 and other drawings.

The video capturing device 910 may acquire surveillance video of a surveillance target region through the plurality of camera modules 910a, 910b, 910c, and 910d.

The video processor 920 may process the surveillance video acquired by the video capturing device 910 to generate a panoramic surveillance video and adjust the video for the surveillance region set within the panoramic surveillance video based on an event detection result.

The panoramic video generator 921 may receive surveillance video data captured by each of the camera modules from the plurality of camera modules 910a, 910b, 910c, and 910d of the video capturing device 910 and then the surveillance video data to generate a panoramic video. In the embodiment of FIG. 9, when the plurality of camera modules 910a, 910b, 910c, and 910d acquire videos constituting each region of the panoramic video and transmit them to the panoramic video generator 921, the panoramic video generator 921 may combine these videos to generate a panoramic video. According to an embodiment, a system-on-chip (SoC) provided in each of the camera modules 910a, 910b, 910c, and 910d may generate an individual video for each of the panoramic regions and an integrated SoC within the video capturing device 910 integrating these individual videos may combine the individual videos of the panoramic regions to generate a single overall panoramic video. The integrated SoC in the video capturing device 910 may generate a video to be output to a virtual channel.

The event detector 922 may detect an event that occurs in the panoramic video generated by the panoramic video generator 921. When the event detector 922 detects the occurrence of an event in the panoramic video, it may determine the position of the occurrence of the detected event and the importance of the detected event.

As for the importance of an event, the user may select a specific event among events detected by the event detector 922 and assign importance thereto, or the event detector 922 may separately assign importance to a specific event among the events detected by the event detector 922 according to criteria set by the user. The criteria set by the user may include an event occurrence time, event occurrence position or region, a type of object in a detected event, or movement of the object. In other words, the event detector 922 may classify the importance of an event by at least one of a method of classifying the importance of an event based on whether the user selects a specific event, a method of identifying the importance of an event based on whether an event occurs in a preset time period, a method of identifying the importance of an event based on whether an event occurs in a preset region, a method of identifying the importance of an event based on the type information of a detected object, and a method of identifying the importance of an event based on movement information of the detected object.

The surveillance region setter 923 may set a partial region of the entire panoramic video generated by the panoramic video generator 921 to a surveillance region and then output a video for the set surveillance region to a virtual channel. At this time, the surveillance region setter 923 may adjust at least one of the number of surveillance regions output to the virtual channel, the size of the surveillance region, and the position of the surveillance region based on the event detection result of the event detector 922.

The surveillance region setter 923 may adjust at least one of the number, size, and position of the surveillance region based on the importance of the event, as well as the occurrence position of the event. When the event detector 922 detects the occurrence of an event in a position other than a partial region set as a surveillance region in the entire panoramic video and the separation degree between the occurrence position within the partial region and the event occurrence position outside the partial region is included in a predetermined separation criterion, the surveillance region setter 923 may perform at least one of moving or enlarging the surveillance region, enlarging or reducing after moving the surveillance region, or reducing after moving the surveillance region so that the surveillance region includes the event occurrence position outside the set partial region. When the separation degree between the event occurrence position within the partial region and the event occurrence position outside the partial region is not included in the predetermined separation criterion, the surveillance region setter 923 may set a certain region including the event occurrence position outside the partial region to a second surveillance region and output a video for the second surveillance region to the second virtual channel, and thereby adjusting the surveillance region according to the event detection result, that is, the event occurrence position. In addition, the surveillance region setter 923 may perform at least one of operations of moving or enlarging the surveillance region, enlarging or reducing the surveillance region after moving, or reducing the surveillance region after moving so that the surveillance region includes a position in which an event of predetermined importance includes a position in which an event occurs, among events whose importance has been determined, and thereby adjusting the surveillance region according to the event detection result, that is, the event occurrence position and importance.

In addition, based on the result of determining the occurrence position of the detected event, when the separation degree between the first object and the second object within the surveillance region is included in the predetermined separation criterion, the surveillance region setter 923 may perform at least one of moving, enlarging, and reducing the surveillance region so that the surveillance region may include both the first object and the second object, and when the separation degree between the first object and the second object within the surveillance region is not included in the predetermined separation criterion, the surveillance region setter 923 may set the event occurrence position including the first object to the surveillance region, output a video for the surveillance region to the virtual channel, set the event occurrence position including the second object to a second surveillance region, and output a video for the second surveillance region to a second virtual channel. In addition, if the separation degree between the first object in the surveillance region and the second object in the second surveillance region is included in the predetermined separation criterion, the surveillance region setter 923 may set a region including both the event occurrence position including the first object and the event occurrence position including the second object to a third surveillance region and output video for the third surveillance region to the virtual channel.

The event detector 922 may determine the type of the detected event and the type of object within the event, and the surveillance region setter 923 may generate a surveillance region corresponding to each type of the detected event, generate a surveillance region corresponding to each type of object within the event, and output a video for each of the generated surveillance regions to a separated virtual channel.

According to an embodiment, in the panoramic surveillance video generating device, the camera module and the video generating device may be implemented as one panoramic surveillance camera, that is, one camera equipped with a plurality of image sensors. The video processor 920 including the panoramic video generator 921, the event detector 922, and the surveillance region setter 923 shown in FIG. 9 may be manufactured in the form of at least one hardware chip, for example, a processor, and mounted in the panoramic surveillance camera. In addition, the functions of the panoramic video generator 921, the event detector 922, and the surveillance region setter 923 may be implemented as computer-readable code in a computer-readable recording medium, so that the function may be performed in software on a processor.

FIG. 10 is a schematic block diagram of a panoramic surveillance camera according to another embodiment.

Referring to FIG. 10, a panoramic surveillance camera 1000 may include an image sensor 1010, an encoder 1020, a memory 1030, a communicator 1040, an AI processing unit 1050, and a processor 1060.

The image sensor 1010 may perform a function of acquiring a video by imaging a surveillance region and may be implemented as, for example, a charge-coupled device (CCD) sensor, a complementary metal-oxide-semiconductor (CMOS) sensor, etc. According to an embodiment, a plurality of image sensors 1010 may be provided to acquire videos for a plurality of surveillance regions.

The encoder 1020 may encode the video acquired through the image sensor 1010 into a digital signal, which may follow, for example, H.264, H.265, MPEG (Moving Picture Experts Group), M-JPEG (Motion Joint Photographic Experts Group) standards, etc.

The memory 1030 may store video data, audio data, a still image, metadata, etc. The metadata may be data including object detection information (movement, sound, intrusion into a designated region, etc.) captured in the surveillance region, object identification information (a person, car, face, hat, clothing, etc.), and detected position information (coordinates, size, etc.). In addition, the still image may be generated together with the metadata and stored in the memory 1030 and may be generated by capturing video information for a specific analysis region among the video analysis information. As an example, the still image may be implemented as a JPEG video file. As an example, the still image may be generated by cropping a specific region of the video data determined to be an identifiable object among the video data of the surveillance region detected in a specific region and for a specific period of time, which may be transmitted in real time together with the metadata.

The communicator 1040 may transmit the video data, audio data, a still image, and/or metadata to a video security solution, such as a DVR, CMS, NVR, or VMS or a display device. The communicator 1040 according to an embodiment may transmit video data, audio data, the still image, and/or metadata to a video security solution in real time. The communicator 1040 may perform at least one communication function among wired and wireless LAN, Wi-Fi, Zig-Bee, Bluetooth™, and near field communication.

The AI processing unit 1050 is for artificial intelligence video processing. According to an embodiment of the present specification, the AI processing unit 1050 may detect the occurrence of an event in a video acquired through a panoramic surveillance camera, detect an occurrence position of the event, and detect a type of object in the event, movement of the object, etc. The AI processing unit 1050 may be implemented as a single module with the processor 1060 that controls the overall system or may be implemented as an independent module. In one or more embodiments of the present specification, a YOLO (You Only Look Once) algorithm may be applied in object detection. YOLO is an AI algorithm suitable for surveillance cameras that may process real-time video with a fast object detection speed. Unlike other object-based algorithms (Faster R-CNN, R_FCN, FPN-FRCN, etc.), the YOLO algorithm may output a bounding box indicating a position of each object by resizing an input video and then allowing the input video to pass through a single neural network and a classification probability of an object. Finally, one object may be recognized (detected) once through non-max suppression. It should be noted that an object recognition algorithm disclosed in this specification is not limited to the aforementioned YOLO and may be implemented as various deep learning algorithms.

The processor 1060 may perform all or some of the functions of the video processor 920, the panoramic video generator 921, the event detector 922, and the surveillance region setter 923 of FIG. 9 described above. The AI processing unit 1050 may perform all or some of the functions of the event detector 922 and the monitoring region setter 923.

FIG. 11 is a diagram illustrating an AI processing unit applied to analysis of a panoramic video according to an embodiment.

Referring to FIG. 11, the AI processing unit 1050 may include an electronic device including an AI module capable of performing AI processing. In addition, the AI processing unit 1050 may be included as at least a portion of the panoramic surveillance camera 1000 and may be provided to perform at least a portion of AI processing. AI processing may include all operations related to the processor 1060 of the panoramic surveillance camera 1000. For example, the panoramic surveillance camera 1000 may perform processing/determination and control signal generating operations by AI-processing an acquired video signal.

The AI processing unit 1050 may be a client device that directly uses AI processing results or may be a device in a cloud environment that provides AI processing results to other devices. The AI processing unit 1050 may be a computing device capable of learning neural networks and may be implemented as various electronic devices, such as servers, desktop PCs, laptop PCs, and tablet PCs.

The AI processing unit 1050 may include an AI processor 21, a memory 25, and/or a communicator 27.

The AI processor 21 may learn a neural network using a program stored in the memory 25. In particular, the AI processor 21 may learn a neural network to recognize related data from a surveillance camera. Here, the neural network for recognizing related data from the surveillance camera may be designed to simulate the human brain structure on a computer and may include a plurality of network nodes with weights that simulate neurons of a human neural network. A plurality of network modes may exchange data according to each connection relationship to simulate the synaptic activity of neurons exchanging signals through synapses. Here, the neural network may include a deep learning model developed from a neural network model. In a deep learning model, a plurality of network nodes are located in different layers and may exchange data according to convolutional connection relationships. Examples of neural network models may include various deep learning techniques, such as deep neural networks (DNN), convolutional deep neural networks (CNN), recurrent Boltzmann machine (RNN), restricted Boltzmann machine (RBM), deep belief networks (DBN) and deep Q-network, and may be applied to fields, such as computer vision, speech recognition, natural language processing, and voice/signal processing.

The processor that performs the aforementioned functions may be a general-purpose processor (e.g., CPU) or may be an AI-specific processor (e.g., a GPU) for artificial intelligence learning.

The memory 25 may store various programs and data necessary for the operation of the AI processing unit 1050. The memory 25 may be implemented as non-volatile memory, volatile memory, flash-memory, hard disk drive (HDD), or solid state drive (SDD). The memory 25 may be accessed by the AI processor 21, and reading/writing/modifying/deleting/updating data may be performed by the AI processor 21. In addition, the memory 25 may store a neural network model (e.g., a deep learning model 26) generated through a learning algorithm for data classification/recognition according to an embodiment of the present disclosure.

The AI processor 21 may include a data learning module 22 that learns a neural network for data classification/recognition. The data learning module 22 may learn standards for what learning data to use to determine data classification/recognition and how to classify and recognize data using the learning data. The data learning module 22 may learn a deep learning model by acquiring learning data to be used for learning and applying the acquired learning data to the deep learning model.

The data learning module 22 may be manufactured in the form of at least one hardware chip and mounted on the AI processing unit 1050. For example, the data learning module 22 may be manufactured in the form of one or more dedicated hardware chips for artificial intelligence (AI) or may be manufactured as portion of a general-purpose processor (CPU) or a graphics processing unit (GPU) and may be mounted on the AI processing unit 1050. In addition, the data learning module 22 may be implemented as a software module. When implemented as a software module (or a program module including instructions), the software module may be stored in a non-transitory computer readable recording medium that may be read by a computer. In this case, at least one software module may be provided by an operating system (OS) or an application.

The data learning module 22 may include a learning data acquiring module 23 and a model training module 24.

The learning data acquiring module 23 may acquire learning data required for a neural network model for classifying and recognizing data.

The model training module 24 may train the neural network model to have a judgement standard on how to classify certain data using the acquired learning data. At this time, the model training module 24 may train the neural network model through supervised learning that uses at least some of the learning data as a judgment standard. Alternatively, the model training module 24 may train the neural network model through unsupervised learning, which may discover a judgment standard, by learning on its own using training data without guidance. In addition, the model training module 24 may train the neural network model through reinforcement learning using feedback on whether a result of the situational judgment based on learning is correct. In addition, the model training module 24 may train the neural network model using a learning algorithm including error back-propagation or gradient descent.

When the neural network model is trained, the model training module 24 may store the trained neural network model in the memory. The model training module 24 may store the learned neural network model in a memory of a server connected to the AI processing unit 1050 through a wired or wireless network.

The data learning module 22 may further include a learning data pre-processor and a learning data selector to improve an analysis result of a recognition model or save the resources or time required for generating the recognition model.

The learning data pre-processor may pre-process acquired data so that the acquired data may be used for learning to determine a situation. For example, the learning data pre-processor may process the acquired data into a preset format so that the model training module 24 may use the acquired learning data for learning for video recognition.

In addition, the learning data selector may select data required for learning from among learning data acquired by the learning data acquiring module 23 or learning data pre-processed by the pre-processor. The selected learning data may be provided to the model training module 24.

In addition, the data learner 22 may further include a model evaluator to improve an analysis result of the neural network model.

The model evaluator may input evaluation data into the neural network model, and when an analysis result output from the evaluation data does not satisfy a predetermined standard, the model evaluating unit may cause the model training module 22 to learn again. In this case, the evaluation data may be predefined data for evaluating the recognition model. As an example, if the number or ratio of evaluation data for which the analysis result is inaccurate, among the analysis results of the trained recognition model for the evaluation data, exceeds a preset threshold, the model evaluator may evaluate that a predetermined standard is not satisfied.

The communicator 27 may transmit the results of AI processing by the AI processor 21 to an external electronic device. For example, external electronic devices may include other surveillance cameras, video security solutions, such as DVR, CMS, NVR, and VMS, or display devices.

The AI processing unit 1050 shown in FIG. 10 has been described as being functionally divided into the AI processor 21, the memory 25, and the communicator 27, but the aforementioned components may be integrated into a single module to be referred to as an AI module.

In the above description, steps, processes or operations may be further divided into additional steps, processes or operations, or may be combined into fewer steps, processes or operations, depending on the implementation of the present disclosure. In addition, some steps, processes, or operations may be omitted, or the order between steps or operations may be switched, as needed. In addition, each step or operation included in the method for generating a panoramic surveillance video described above may be implemented as a computer program and stored in a computer-readable recording medium, and each step, process, or operation may be executed by a computer device.

The term "unit" (e.g., a controller, etc.) used herein may refer to, for example, a unit including one or a combination of two or more of hardware, software, or firmware. "Part" may be used interchangeably with terms, such as unit, logic, logical block, component, or circuit, for example. "Part" may be a minimum unit of an integral component or a portion thereof. "Part" may be a minimum unit performing one or more functions or a portion thereof. "Part" may be implemented mechanically or electronically. For example, "part" may include at least one of application-specific integrated circuit (ASIC) chip, field-programmable gate arrays (FPGAs), or programmable-logic devices, known or to be developed in the future, that perform certain operations.

At least a portion of a device (e.g., modules or functions thereof) or method (e.g., operations) according to various embodiments may be implemented with instructions stored in a computer-readable storage medium, e.g., in the form of a program module. When the instruction is executed by a processor, the one or more processors may perform the function corresponding to the instruction. Computer-readable medium includes all types of recording devices that store data that may be read by a computer system. Computer-readable storage mediums/computer-readable recording mediums may include hard disks, floppy disks, magnetic mediums (e.g. magnetic tape), optical mediums (e.g. compact disc read only memory (CD-ROM), digital versatile disc (DVD), magneto-optical mediums (e.g. floptical disk), hardware devices (e.g. read only memory (ROM), random access memory (RAM), or flash memory, etc.), and may also include those implemented in the form of a carrier wave (e.g., transmission via the Internet). Program instructions may include high-level language code that may be executed by a computer using an interpreter, etc., as well as machine language CODE, such as that generated by a compiler. The aforementioned hardware device may be configured to operate as one or more software modules to perform the operations of various embodiments and vice versa.

A module or program module according to various embodiments may include at least one of the aforementioned components, some of them may be omitted or may further include other additional components. Operations performed by modules, program modules, or other components according to various embodiments may be executed sequentially, in parallel, iteratively, or in a heuristic manner. In addition, some operations may be executed in a different order, omitted, or other operations may be added.

As used herein, the term "one" is defined as one or one or more. In addition, the use of introductory phrases, such as "at least one" and "one or more" in the claims should not be interpreted as meaning that, even if introductory phrases, such as "at least one" and "one or more" and ambiguous phrases, such as "one" is included in the same claim, the introduction, if any, of another claim element by the ambiguous phrase "one" does not mean that any particular claim including the introduced claimed element is limited to an invention including only one such element.

In this document, expressions, such as "A or B" or "at least one of A and/or B" may include all possible combinations of the items listed together.

Unless otherwise specified, terms, such as "first" and "second" are used to optionally distinguish between the elements described by such terms. Accordingly, these terms are not necessarily intended to indicate temporal or other priority of such elements, and the mere fact that particular means are recited in different claims does not indicate that a combination of such means cannot be advantageously used. Accordingly, these terms are not necessarily intended to indicate temporal or other priority of such elements. The mere fact that a particular measure is cited in different claims does not indicate that a combination of these measures cannot be used usefully.

The phrase "may be X" indicates that condition X may be met. This phrase also indicates that condition X may not be met. For example, a reference to a system including a specific component should also include scenarios in which the system does not include a specific component. For example, a reference to a method that includes a specific operation should also include scenarios in which the method does not include a specific component. However, as another example, a reference to a system configured to perform a specific operation should also include scenarios in which the system is not configured to perform a specific task.

The terms "comprising," "including," "having," "configured," and "consisting essentially of" are used interchangeably. For example, any method may include at least the operations included in the drawings and/or the specification or may include only the operations included in the drawings and/or the specification. Alternatively, the word "comprising" "including," "having," and the like do not exclude the presence of elements or acts listed in a claim.

According to embodiments disclosed in this specification, a surveillance region of a panoramic video output from to a virtual channel may be actively adjusted according to an event occurrence situation, thereby increasing surveillance efficiency.

The apparatus and method for generating a panoramic surveillance video of the present disclosure have been described based on examples applied to a surveillance camera system that generates a panoramic video by combining videos acquired from a plurality of image sensors but may also be applied to various surveillance camera systems.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A panoramic surveillance video generating apparatus comprising:
a plurality of image sensors configured to acquire a plurality of surveillance videos;
at least one processor configured to:
generate a panoramic video by combining the plurality of surveillance videos,
detect a first event and a second event occurring in the panoramic video,
determine a first occurrence position at which the first event occurs, and a second occurrence position at which the second event occurs,
set a partial region of the panoramic video as a surveillance region, wherein the first occurrence position at which the first event occurs is within the partial region, and the second occurrence position at which the second event occurs is outside the partial region,
output a video of the surveillance region to a virtual channel,
adjust at least one of a quantity of the surveillance region, a size of the surveillance region, and a position of the surveillance region based on the first occurrence position of the first event and the second occurrence position of the second event,
based on a separation degree between the first occurrence position within the partial region and the second occurrence position outside the partial region being within a predetermined separation criterion, perform at least one operation among moving the surveillance region, enlarging the surveillance region, and reducing the surveillance region to include the second occurrence position, and
based on the separation degree between the first occurrence position within the partial region and the second occurrence position outside the partial region not being within the predetermined separation criterion, set a second partial region including the second occurrence position outside the partial region as a second surveillance region, and output a video of the second surveillance region to a second virtual channel while outputting the video of the surveillance region to the virtual channel.

2. The panoramic surveillance video generating apparatus of claim 1, wherein the at least one processor is further configured to:
determine an importance of the first event and the second event, and
adjust at least one of the size of the surveillance region and the position of the surveillance region based on the first occurrence position, the second occurrence position, the importance of the first event, and the importance of the second event.

3. The panoramic surveillance video generating apparatus of claim 2, wherein the at least one processor is further configured to:
perform the at least one operation among moving the surveillance region, enlarging the surveillance region, and reducing the surveillance region to include an occurrence position at which an event of a predetermined importance, among the first event and the second event of which importances have been determined, has occurred.

4. The panoramic surveillance video generating apparatus of claim 3, wherein the operation of moving the surveillance region comprises moving the surveillance region to include both the first occurrence position within the partial region and the second occurrence position outside the partial region to be output to the virtual channel, wherein the operation of enlarging the surveillance region comprises enlarging the surveillance region to include the first occurrence position within the partial region and the second occurrence position outside the partial region to be output to the virtual channel based on the first occurrence position within the partial region and the second occurrence position outside the partial region not being output to a same virtual channel due to a movement of the surveillance region, and wherein the operation of reducing the surveillance region comprises reducing the surveillance region based on the first occurrence position and the second occurrence position being included in a region smaller than the surveillance region corresponding to the partial region.

5. The panoramic surveillance video generating apparatus of claim 2, wherein the at least one processor is further configured to:

determine the importance of an event based on at least one of:

a user selection, whether the event occurs at a preset time, whether the event occurs in a preset region, based on the event corresponding to an object, a type information of the object, and based on the event corresponding to the object, movement information of the object.

6. The panoramic surveillance video generating apparatus of claim 1, wherein the first event corresponds to a first object within the partial region, and the second event corresponds to a second object outside the partial region, and wherein the at least one processor is further configured to:

based on a separation degree between the first object and the second object being within the predetermined separation criterion, perform the at least one operation among moving the surveillance region, enlarging the surveillance region, and reducing the surveillance region to include both the first object and the second object, and based on the separation degree between the first object and the second object not being within the predetermined separation criterion, set a partial region including the first object as the surveillance region, output the video of the surveillance region to the virtual channel, set a second partial region including the second object as the second surveillance region, and output the video of the second surveillance region to the second virtual channel while outputting the video of the surveillance region to the virtual channel.

7. The panoramic surveillance video generating apparatus of claim 6, wherein the at least one processor is further configured to:

based on the separation degree between the first object and the second object being within the predetermined separation criterion, set a partial region including both the first object and the second object as a third surveillance region and output a video for the third surveillance region to the virtual channel.

8. The panoramic surveillance video generating apparatus of claim 1, wherein the at least one processor is further configured to:

determine a type of a detected event and a type of object within the detected event, generate a surveillance region corresponding to the type of the detected event and the type of object within the detected event, and output a video of the generated surveillance region to a respective virtual channel.

9. A method for setting a surveillance region by a panoramic surveillance video generating apparatus, the method comprising:

obtaining a plurality of surveillance videos through a plurality of image sensors;

generating a panoramic video by combining the plurality of surveillance videos;

detecting a first event and a second event occurring within the panoramic video;

determining a first occurrence position at which the first event occurs, and a second occurrence position at which the second event occurs;

setting a partial region of the panoramic video as a surveillance region, wherein the first occurrence position at which the first event occurs is within the partial region, and the second occurrence position at which the second event occurs is outside the partial region;

adjusting the surveillance region comprising adjusting at least one of a quantity of the surveillance region, a size of the surveillance region, and a position of the surveillance region based on the first occurrence position of the first event and the second occurrence position of the second event; and outputting a video of the surveillance region to a virtual channel, wherein the adjusting the surveillance region comprising adjusting at least one of a quantity of the surveillance region, the size of the surveillance region, and the position of the surveillance region based on the first occurrence position of the first event and the second occurrence position of the second event, comprises:

based on a separation degree between the first occurrence position within the partial region and the second occurrence position outside the partial region being within a predetermined separation criterion, performing at least one operation among moving the surveillance region, enlarging the surveillance region, and reducing the surveillance region to include the second occurrence position, and based on the separation degree between the first occurrence position within the partial region and the second occurrence position outside the partial region not being within the predetermined separation criterion, setting a second partial region including the second occurrence position outside the partial region as a second surveillance region, and outputting a video of the second surveillance region to a second virtual channel while outputting the video of the surveillance region to the virtual channel.

10. The method of claim 9, wherein the adjusting the surveillance region comprises:

determining an importance of the first event and the second event, and adjusting at least one of the size of the surveillance region and the position of the surveillance region based on the first occurrence position, the second occurrence position, the importance of the first event, and the importance of the second event.

11. The method of claim 10, wherein the adjusting the at least one of the size of the surveillance region and the position of the surveillance region based on the first occurrence position, the second occurrence position, the importance of the first event, and the importance of the second event comprises performing at least one operation among moving the surveillance region, enlarging the surveillance region, and reducing the surveillance region to include an occurrence position at which an event of a predetermined importance, among a plurality of events whose importances have been determined, has occurred, wherein the operation of moving the surveillance region comprises moving the surveillance region to include both the first occurrence position within the partial region and the second occurrence position outside the partial region to be output to the virtual channel, wherein the operation of enlarging the surveillance region comprises enlarging the surveillance region to include the first occurrence position within the partial region and the second occurrence position outside the partial region to be output to the virtual channel based on first occurrence position within the partial region and the second occurrence position outside the partial region not being output to a same virtual channel due to a movement of the surveillance region, and wherein the operation of reducing the surveillance region comprises reducing the surveillance region based on the first occurrence position and the second occurrence position being included in a region smaller than the surveillance region corresponding to the partial region.

12. The method of claim 10, wherein the determining the importance of an event is based on at least one of:

whether a user selects the event, whether the event occurs at a preset time, whether the event occurs in a preset region, based on the event corresponding to an object, type information of the object, and based on the event corresponding to the object, movement information of the object.

13. The method of claim 9, wherein the detecting the first event and the second event occurring in the panoramic video comprises detecting a first object corresponding to the first event within the partial region and a second object corresponding to the second event outside the partial region, and wherein the adjusting the at least one of the quantity of the surveillance region, the size of the surveillance region, and the position of the surveillance region based on the first occurrence position of the first event and the second occurrence position of the second event comprises:

performing at least one operation among moving the surveillance region, enlarging the surveillance region, and reducing the surveillance region to include both the first object and the second object, based on a separation degree between the first object and the second object being within the predetermined separation criterion based on a result of determining the first occurrence position of the first event and the second occurrence position of the second event, and setting the partial region including the first object as the surveillance region, outputting the video of the surveillance region to the virtual channel, setting a second partial region including the second object as the second surveillance region, and outputting a video of the second surveillance region to the second virtual channel while the video of the surveillance region is being output to the virtual channel, based on the separation degree between the first object and the second object not being within the predetermined separation criterion.

14. The method of claim 13, wherein the adjusting the at least one of the quantity of the surveillance region, the size of the surveillance region, and the position of the surveillance region based on the first occurrence position of the first event and the second occurrence position of the second event comprises:

setting a region including both the first object and the second object as a third surveillance region, and outputting a video of the third surveillance region to the virtual channel, based on the separation degree between the first object and the second object being within the predetermined separation criterion.

15. The method of claim 9, wherein the setting the partial region comprises:

determining a type of a detected event and a type of object within the detected event; and generating a surveillance region corresponding to the type of the detected event and the type of object within the detected event, and wherein a video of the generated surveillance region is output to a respective virtual channel.

16. A panoramic surveillance camera comprising:

a plurality of image sensors configured to acquire a plurality of surveillance videos; and at least one processor configured to:

generate a panoramic video by combining the plurality of surveillance videos, set one or more partial regions of the panoramic video as one or more surveillance regions, and output one or more videos of the one or more surveillance regions as one or more virtual channels, respectively, wherein the at least one processor is configured to:

detect a first event and a second event occurring within the panoramic video, detect a movement of a first object corresponding to the first event and a second object corresponding to the second event, determine a first occurrence position at which the first event occurs, and a second occurrence position at which the second event occurs, wherein the first occurrence position at which the first event occurs is within a first partial region, and the second occurrence position at which the second event occurs is in a second partial region outside the first partial region, and adjust at least one of a quantity of the one or more surveillance regions, a size of the one or more surveillance regions, and a position of the one or more surveillance regions output to the one or more virtual channels based on a result of detecting the first event, the second event, the movement of the first object, and the movement of the second object, wherein, based on a separation degree between the first object and the second object being within a predetermined separation criterion, a partial region including the first object and the second object is set as a same surveillance region and is output as a video to a same virtual channel, and wherein, based on the separation degree between the first object and the second object not being within the predetermined separation criterion, the first partial region including the first object is set as a first surveillance region and is output as a video to a first virtual channel, and the second partial region including the second object is set as a second surveillance region and is output as a video to a second virtual channel, and wherein the one or more surveillance regions are dynamically adjusted based on the detected movements of the first object and the second object within the panoramic video according to the separation degree relative to the predetermined separation criterion.

17. The panoramic surveillance video generating apparatus of claim 1, wherein the panoramic video comprises a plurality of partial regions respectively corresponding to the plurality of surveillance videos acquired by the plurality of image sensors, wherein the first occurrence position at which the first event occurs is within a first partial region, and the second occurrence position at which the second event occurs is within a second partial region outside the first partial region, among the plurality of partial regions, wherein the separation degree between the first occurrence position and the second occurrence position is within the predetermined separation criterion based on the first partial region and the second partial region being adjacent regions, among the plurality of partial regions, and wherein the separation degree between the first occurrence position and the second occurrence position is not within the predetermined separation criterion based on the first partial region and the second partial region not being adjacent to each other, among the plurality of partial regions.

\* \* \* \* \*